(12) United States Patent
Fukumoto

(10) Patent No.: US 11,686,421 B2
(45) Date of Patent: Jun. 27, 2023

(54) VACUUM THERMAL INSULATION PANEL AND METHOD OF PRODUCING THE SAME

(71) Applicant: Tiger Corporation, Osaka (JP)

(72) Inventor: Shinji Fukumoto, Osaka (JP)

(73) Assignee: Tiger Corporation, Osaka (JP)

( * ) Notice: Subject to any disclaimer, the term of this patent is extended or adjusted under 35 U.S.C. 154(b) by 0 days.

(21) Appl. No.: 16/627,957

(22) PCT Filed: Sep. 25, 2019

(86) PCT No.: PCT/JP2019/037609
§ 371 (c)(1),
(2) Date: Dec. 7, 2021

(87) PCT Pub. No.: WO2020/174734
PCT Pub. Date: Sep. 3, 2020

(65) Prior Publication Data
US 2022/0099235 A1    Mar. 31, 2022

(30) Foreign Application Priority Data
Feb. 28, 2019 (JP) ............................. JP2019-035407

(51) Int. Cl.
*F16L 59/065* (2006.01)
*B23K 26/244* (2014.01)

(52) U.S. Cl.
CPC .......... *F16L 59/065* (2013.01); *B23K 26/244* (2015.10)

(58) Field of Classification Search
None
See application file for complete search history.

(56) References Cited

FOREIGN PATENT DOCUMENTS

| | | |
|---|---|---|
| JP | 08-082474 A | 3/1996 |
| JP | 08-086394 A | 4/1996 |
| JP | 2007-239764 A | 9/2007 |
| JP | 2008-256125 A | 10/2008 |
| JP | 2009-222098 A | 10/2009 |
| JP | 2011-058538 A | 3/2011 |
| JP | 2011-185413 A | 9/2011 |
| JP | 2017-53400 A | 3/2017 |

*Primary Examiner* — Alexander S Thomas
(74) *Attorney, Agent, or Firm* — Downs Rachlin Martin PLLC

(57) ABSTRACT

It is an object of the present invention to provide a method of producing a vacuum thermal insulation panel capable of reducing the occurrence probability of poor welding of a metal outer wrapping material. The method of producing the vacuum thermal insulation panels 100, 100A to 100 D, 101, 101A according to the present invention includes a "covering step of covering a core material 110 or 110B with a metal foil 130 or 131" and a "welding step of welding a metal foil portion on an outer side of the core material", and the core material is at least partially covered with a cover 120, 120A, or 120D at a timing when the covering step is to be started. Note that when the entire surface of the core material is covered with the cover, it is preferable to reduce the inside of the cover to seal the cover before the covering step, and when a part of the core material is covered with the cover, it is preferable to simultaneously reduce a pressure inside the metal foil and a pressure inside the cover to seal the metal foil.

8 Claims, 3 Drawing Sheets

VACUUM THERMAL INSULATION PANEL AND METHOD OF PRODUCING THE SAME

TECHNICAL FIELD

The present invention relates to a vacuum thermal insulation panel and a method of producing the same.

BACKGROUND ART

In the past, the following technique was proposed (see, for example, JP2017-053400):

"a method of producing a vacuum thermal insulation panel in which a core material made of inorganic fibers is wrapped with an outer wrapping material and the inner space of the outer wrapping material wrapping the core material is in a vacuum state, the method comprising:

a step of heating the core material to reduce the moisture content of the core material to 0.05% by weight or less;

a step of wrapping the core material with the outer wrapping material; and a sealing step of sealing an opening portion of the outer wrapping material by welding in a state in which a pressure of the inner space of the outer wrapping material wrapping the core material is 1 Pa or less, wherein the surface roughness Ra of a surface of the outer wrapping material, which is to be on an inner space side, is 0.2 µm or less."

PRIOR ART DOCUMENTS

Patent Literature

Patent literature 1: JP2017-053400

SUMMARY OF THE INVENTION

Problem to be Solved by Invention

Generally, inorganic fibers such as glass wool, silica wool, ceramic wool, or the like, porous board such as corkboard or the like, blanket, and the like are used as the core material of the vacuum thermal insulation panel. Many of these core materials are relatively brittle, and when an outer wrapping material made of metal such as a stainless steel plate is disposed above and below such a core material, a part of the outer wrapping material may fall off from the core material and adhere to a welded portion of the lower outer wrapping material. Welding the outer wrapping material in such a state in which the dropped matter from the core material adheres to the welded portion of the outer wrapping material increases a possibility of occurrence of poor welding.

It is an object of the present invention to provide a method of producing a vacuum thermal insulation panel capable of reducing the occurrence probability of poor welding of a metal outer wrapping material.

Means of Solving the Problems

A method of producing a vacuum thermal insulation panel according to the present invention includes:

a covering step of covering a core material with a metal foil;

a welding step of welding a metal foil portion on an outer side of the core material, wherein the core material is at least partially covered with a cover at a timing when the covering step is to be started.

In the above configuration, at least a part of the core material is covered with the cover in the covering step. Thus, this method of producing a vacuum thermal insulation panel reduces the possibility that objects fallen off from the core material adhere to the welded portion of the metal foil. Accordingly, this method of producing a vacuum thermal insulation panel allows for reducing the occurrence probability of poor welding of a metal foil.

In the present invention, it is preferable that a first pressure-reduction sealing step of reducing a pressure inside the cover to seal the cover is performed before the covering step, and a second pressure-reduction sealing step of reducing a pressure inside the metal foil to seal the metal foil is performed after the welding step.

In the above configuration, in the covering step, the core material is completely covered with the cover, and the inside of the cover is in a state with a reduced pressure. Thus, this method of producing a vacuum thermal insulation panel almost eliminates a possibility that objects dropped off from the core material adhere to the welded portion of the metal foil (metal outer wrapping material), and furthermore reduces a possibility of expansion of the cover in the second pressure-reduction sealing step.

In the present invention, it is preferable that the core material is partially covered with a cover, and a pressure-reduction sealing step of reducing a pressure inside the metal foil and a presumptuous inside the cover to seal the metal foil is performed after the welding step.

In the above configuration, in the covering step, a part of the core material is covered with the cover, and in the pressure-reduction sealing step, the pressure inside the metal foil and the press inside the cover are reduced to seal the metal foil. Thus, this method of producing a vacuum thermal insulation panel reduces a possibility that the dropped matter from the core material adhere to the welded portion of the metal foil (metal outer wrapping material), and furthermore allows for reducing the pressure inside the metal foil and the pressure inside the cover simultaneously. Accordingly, this method of producing a vacuum thermal insulation panel allows for reducing the occurrence probability of poor welding of a metal foil, and furthermore allows for reducing operating costs of a pressure reducing apparatus.

In the present invention, it is preferable that a first exhaust port is formed in the cover, a second exhaust port is formed in the metal foil, and the first exhaust port and the second exhaust port at least partially overlap with each other.

The above configuration allows for reducing a pressure in the metal foil while efficiently sucking the air inside in the pressure-reduction sealing step.

In the present invention, it is preferable that a water absorption rate of the cover is 1% or less.

The above configuration allows for reducing a possibility that moisture evaporates from the cover and the metal foil gradually swells in the vacuum thermal insulation panel to be finally obtained.

In the present invention, it is preferable that irregularities are formed on a surface of the cover on a side toward the metal foil.

The above configuration allows for reducing the pressure in the metal foil while efficiently sucking the air existing between the cover and the metal foil in the second pressure-production sealing step or the pressure-reduction sealing step.

A vacuum thermal insulation panel according to the present invention includes:

a core material; and a metal foil that covers the core material to be covered with the cover, and the core material is covered with a cover.

The above configuration reduces a possibility that the dropped matter from the core material adheres to the welded portion of the metal foil at the time of manufacturing. This causes many vacuum thermal insulation panels with well-welded metal foils to be produced.

In the present invention, it is preferable that a pressure in the metal foil and a pressure in the cover are both within a range from 0.00001 Pa to 100 Pa inclusive, and the core material has a density within a range from 1 kg/m$^3$ to 600 kg/m$^3$ inclusive.

The above configuration allows for imparting good thermal insulation performance to the vacuum thermal insulation panel.

In the present invention, it is preferable that irregularities are formed on a surface of the cover on a side toward the metal foil.

The above configuration increases a proportion of a pressure-reduced space to the entire space in the vacuum thermal insulation panel. This allows the thermal insulation performance of the vacuum thermal insulation panel to be slightly enhanced. In addition, it is possible to reduce the pressure in the metal foil while efficiently sucking the air existing between the cover and the metal foil at the time of manufacturing.

DESCRIPTION OF EMBODIMENTS

First Embodiment

Figure 1:
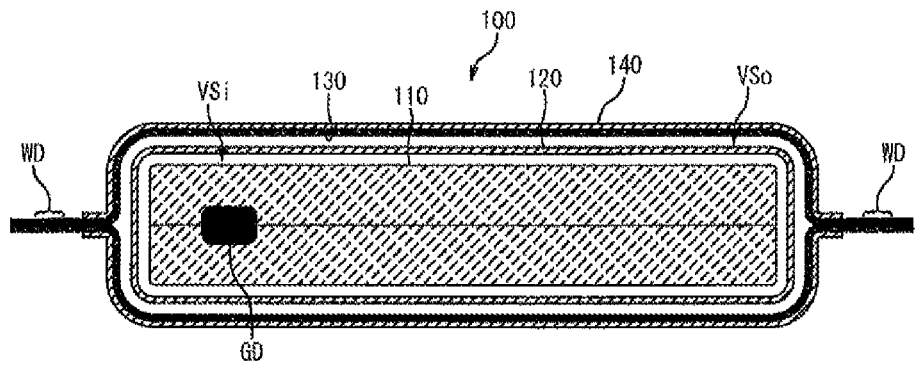
FIG. 1 is a vertical cross-sectional view of an example of a vacuum thermal insulation panel according to a first embodiment of the present invention.

In a method of producing a vacuum thermal insulation panel according to a first embodiment of the present invention, a core material covering step, a covering step, a welding step, an evacuation step, and a sealing step are performed, and as a result, a vacuum thermal insulation panel 100 shown in FIG. 1 is obtained. Hereinafter, each step constituting the method of producing the vacuum thermal insulation panel according to an embodiment of the present invention will be described in detail.

(1) Core Covering Step

In the core material covering step, the core material 110 (see reference numeral 110 in FIG. 1) is covered and sealed with a resin cover 120. As shown in FIG. 1, a getter agent (desiccant) GD is typically embedded in the core material 110. In the resin-covered core material thus obtained, the interior of the cover 120 is sufficiently evacuated. Note that the internal pressure of the cover 120 after evacuation is preferably within a range from 0.00001 Pa to 100 Pa inclusive, and more preferably within a range from 1 Pa to 100 Pa inclusive. Incidentally, examples of methods of covering the core material 110 with the cover 120 and sufficiently evacuating the inside of the cover 120, for example include a) a method of inserting the core material 110 into a bag made of resin, sufficiently evacuating the inside of the bag, and then sealing the bag, b) a method of laminating the core material 110 with a resin film under an evacuated environment, c) a method of coating the core material 110 with resin under an evacuated environment, and the like. Note that for example, inorganic fibers such as glass wool, silica wool, ceramic wool, or the like, porous board such as corkboard or the like, blanket, and the like can be used as the core material 110. The core material 110 is preferably sufficiently dried before being covered with the cover 120. The density of the core material 110 is preferably within a range from 1 kg/m$^3$ to 600 kg/m$^3$ inclusive, and more preferably within a range from 100 kg/m$^3$ to 500 kg/m$^3$ inclusive. This is because the core material 110 can exhibit good thermal conductivity while reducing a decrease in thermal conductivity of the core material 110 due to crushing of the core material 110 during the evacuation step. The resin bag or film is preferably formed of a resin such as nylon, polypropylene, polyethylene terephthalate, or the like. Among these resins, low hygroscopic resins such as polyethylene terephthalate or the like are particularly preferable. The water absorption rate of the low hygroscopic resin is preferably 1% or less. The resin bag may be formed of a low hygroscopicity resin film such as an evaporation film; furthermore, the resin film may be a low hygroscopicity resin film such as an evaporation film. A coating liquid for resin coating or the like preferably contains the same low hygroscopic resin as described above.

(2) Covering Step

In the covering step, a resin-covered core material is disposed at the center of the upper surface of metal foil 130 contained in one metal foil 130 with a protective layer 140 in a plan view, and then another metal foil 130 with a protective layer 140 is covered from above so that the metal foil side is in contact with the resin-covered core material. In other words, the resin-covered core material is sandwiched between the two metal foils 130 with the protective layers 140 so that the resin-covered core material is positioned at the center of the two metal foils 130 with the protective layers 140 in a plan view and the metal foil side faces the resin-covered core material. Note that a portion where the resin-covered core material and the metal foil 130 with the protective layer 140 overlap in a plan perspective view is a main body portion. In addition, the width and depth of at least one of the metal foils 130 with the protective layer 140 respectively need to be equal to or greater than a value each obtained by adding twice the thickness of the resin-covered core material and its welding margin to the width and depth of the resin-covered core material. This is because the resin-covered core material is completely covered with two metal foils 130 with the protective layer 140. Incidentally, as shown in FIG. 1, the metal foil 130 with the protective layer 140 has no protective layer 140 in the outer edge portion of the metal foil 130. This is because the outer edge portion of the metal foil 130 is to be welded in the welding step. As the metal foil 130, for example, a stainless steel foil, an iron foil, an aluminum foil, a titanium foil, or the like is used. As the stainless steel foil, for example, a foil having a thickness of 0.1 mm or less is used in order to inhibit a heat bridge between the metal foil 130 on the front side and the metal foil on the back side in the vacuum thermal insulation panel 100.

(3) Welding Step

In the welding step, the four-sided outer edge portions of the metal foil 130 with the protective layer 140 are welded (refer to a reference WD in FIG. 1 for welding portions). The welding method should not limited to particular one; for example, a welding method such as laser welding or electric resistance welding may be used.

(4) Vacuum Drawing Step

Figure 2:
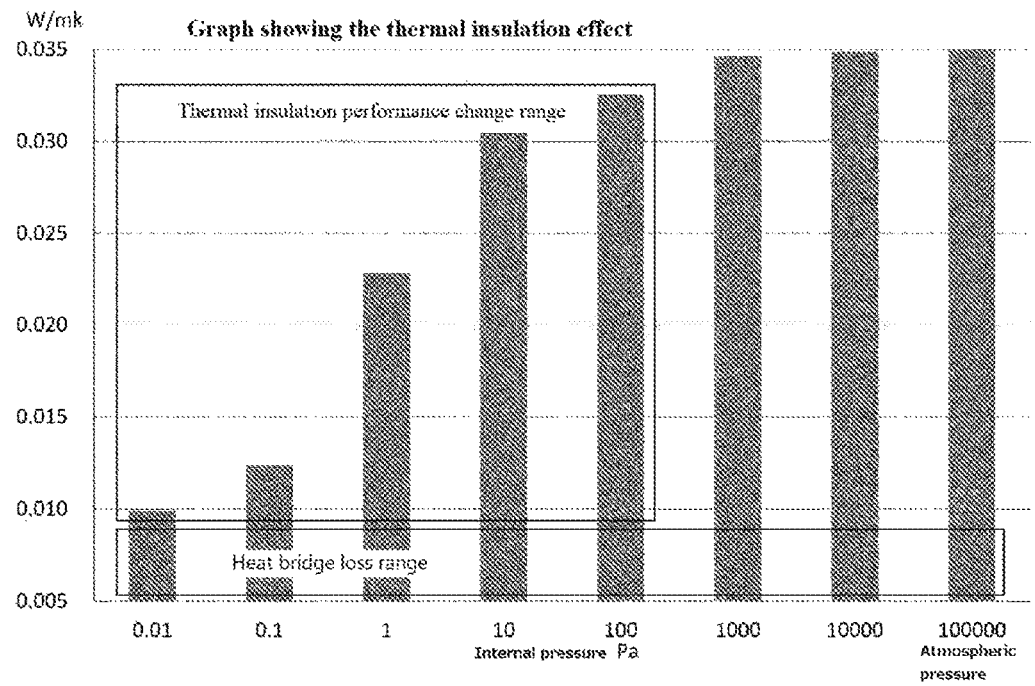
FIG. 2 is a graph showing the thermal insulation effect of the vacuum thermal insulation panel shown in FIG. 1.

In the evacuation step, the laminate with its four sides welded is placed in a vacuum heating furnace in a state in which a metal disk-shaped lid (not shown) is put on a lid receiving portion (not shown) of the upper metal foil 130 with the protective layer 140 with a metal-based brazing material interposed therebetween, and then a vacuum is produced by evacuation. Note that the inside air is discharged through an exhaust port (not shown) provided on the center side of the lid receiving portion of the upper metal foil 130. Note that the internal pressure of the metal foil 130 with the protective layer 140 after evacuation is preferably within a range from 0.00001 Pa to 100 Pa inclusive, more preferably within a range from 1 Pa to 100 Pa inclusive, and still more preferably within a range from 1 Pa to 10 Pa inclusive. This is because, as shown in FIG. 2, sufficient thermal insulation performance can be imparted to the vacuum thermal insulation panel 100. The absolute difference between a pressure in the metal foil 130 with the protective layer 140 and a pressure in the cover 120 is preferably 10 Pa or less, more preferably 5 Pa or less, and still more preferably 1 Pa or less. This is because deformation of the vacuum thermal insulation panel 100 can be reduced.

(5) Sealing Step

In the sealing step, the above-described laminate is heated by raising the furnace temperature of the vacuum heating furnace, and the metallic lid is brought into close contact with the lid receiving portion with the melted metallic brazing material, and then the furnace temperature of the vacuum heating furnace is lowered to solidify the metallic brazing material, and the inside of the above-described laminate is brought into a vacuum state and sealed, thereby obtaining the vacuum thermal insulation panel shown in FIG. 1. In FIG. 1, a space is provided between the outer surface of the core material 110 and the inner surface of the cover 120, and the space is denoted by VSi; a space is provided between the outer surface of the cover 120 and the inner surface of the metal foil 130, and the space is denoted by VSo. It should be noted that although both the space VSi and the space VSo represent a vacuum space, the space VSi and the space VSo are depicted with their thicknesses exaggerated.

<Features of the Method for Producing a Vacuum Thermal Insulation Panel According to the First Embodiment of the Present Invention>

In the method of producing the vacuum thermal insulation panel 100 according to the first embodiment of the present invention, in the covering step, the resin-covered core material in which the core material 110 is completely covered with the cover 120 is sandwiched between the two metal foils 130 with the protective layer 140. Thus, the method of producing the vacuum thermal insulation panel 100 reduces the possibility that objects fallen off from the core material 110 adhere to the welded portion of the metal foil 130. Accordingly, the method of producing the vacuum thermal insulation panel 100 allows for reducing the occurrence probability of poor welding of the metal foil 130. In the resin-covered core material, the interior of the cover 120 is evacuated. Thus, the method of producing the vacuum thermal insulation panel 100 allows for reducing the possibility of expansion of the cover 120 in the evacuation step.

Modifications (A)

Figure 3:
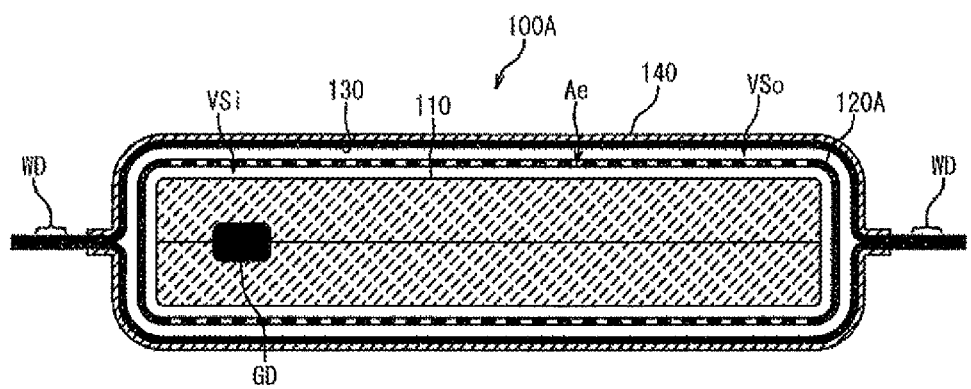
FIG. 3 is a vertical cross-sectional view of an example of a vacuum thermal insulation panel according to a modification (A) of the first embodiment.

In the method of producing the vacuum thermal insulation panel according to the above embodiment, the vacuum thermal insulation panel 100 as shown in FIG. 1 is produced; alternatively, a vacuum thermal insulation panel 100A as shown in FIG. 3 may be produced. The vacuum thermal insulation panel 100A shown in FIG. 3 differs from the vacuum thermal insulation panel 100 shown in FIG. 1 in that a plurality of vent holes Ae are provided in a cover 120A. As the cover 120A, for example, the above-mentioned resin film or vapor deposition film having a plurality of holes formed therein, porous film, paper, nonwoven fabric, metal mesh, resin mesh, or the like can be used. In such a case, it is unnecessary to evacuate the inside of the cover 120A in the core material covering step; instead, evacuation of the inside of the cover 120A is performed simultaneously with evacuation of the inside of the metal foil 130 with the protective layer 140 in the evacuation step. In this case, it is preferable that at least a part of the vent holes Ae overlaps with the exhaust port of the lid receiving portion of the upper metal foil 130 in a plan view. The method of producing the vacuum thermal insulation panel 100A reduces the possibility that the dropped matter from the core material 110 adheres to the welded portion of the metal foil 130, and furthermore reduces the pressure inside the metal foil 130 and inside the cover 120A simultaneously. Thus, the method of producing the vacuum thermal insulation panel 100A allows for reducing the occurrence probability of poor welding of the metal foil 130, and furthermore allows for reducing operating costs of a pressure reducing apparatus.

(B)

Figure 4:
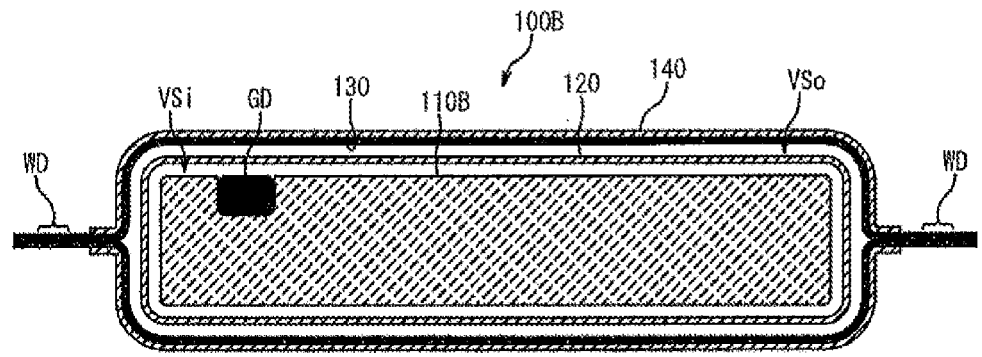
FIG. 4 is a vertical cross-sectional view of an example of a vacuum thermal insulation panel according to a modification (B) of the first embodiment.

In the method of producing the vacuum thermal insulation panel according to the above embodiment, the vacuum thermal insulation panel 100 as shown in FIG. 1 is produced; alternatively, a vacuum thermal insulation panel 100B as shown in FIG. 4 may be produced. The vacuum thermal insulation panel 100B shown in FIG. 4 differs from the vacuum thermal insulation panel 100 shown in FIG. 1 in that the getter agent GD is present at a position exposed on the upper surface of the core material 110B.

(C)

Figure 5:
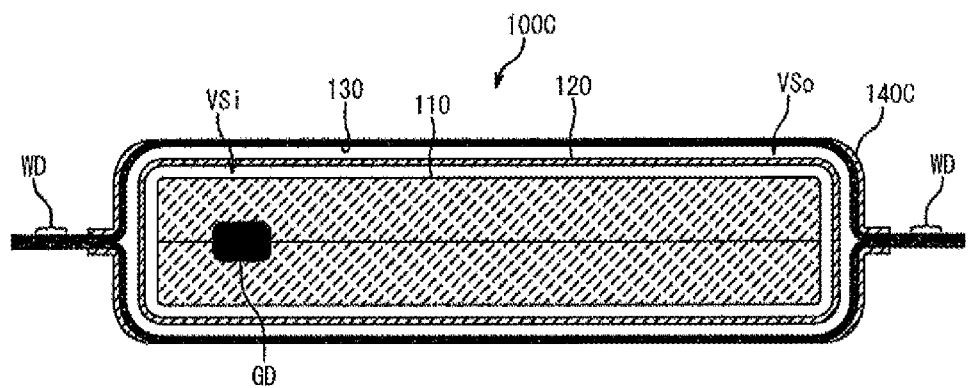
FIG. 5 is a vertical cross-sectional view of an example of a vacuum thermal insulation panel according to a modification (C) of the first embodiment.

In the method of producing the vacuum thermal insulation panel according to the above embodiment, the vacuum thermal insulation panel 100 as shown in FIG. 1 is produced; alternatively, a vacuum thermal insulation panel 100C as shown in FIG. 5 may be produced. The vacuum thermal insulation panel 100C shown in FIG. 5 differs from the vacuum thermal insulation panel 100 shown in FIG. 1 in that the protective layer 140C is provided only on the side surfaces of the metal foil 130.

(D)

Figure 6:
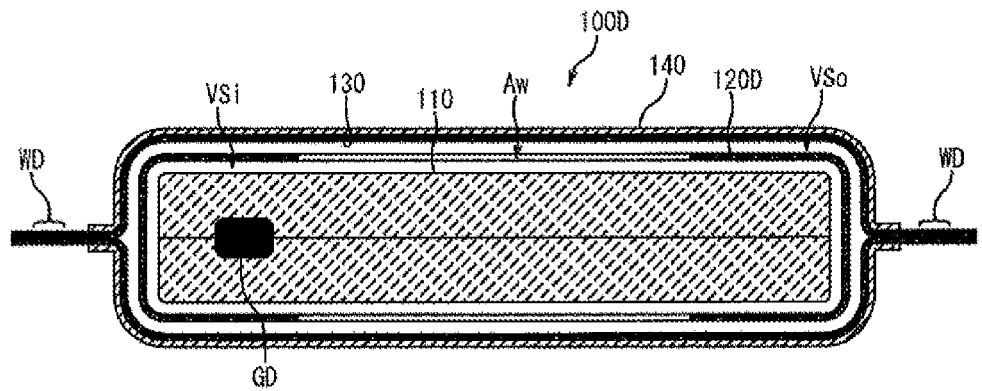
FIG. 6 is a vertical cross-sectional view of an example of a vacuum thermal insulation panel according to a modification (D) of the first embodiment.
Figure 7:
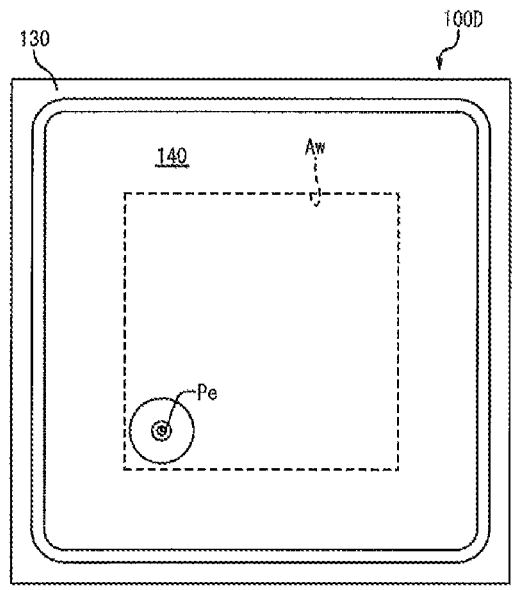
FIG. 7 is a partial plan perspective view of an example of a vacuum thermal insulation panel according to a modification (D) of the first embodiment.

In the method of producing the vacuum thermal insulation panel according to the above embodiment, the vacuum thermal insulation panel 100 as shown in FIG. 1 is produced; alternatively, a vacuum thermal insulation panel 100D as shown in FIG. 6 may be produced. The vacuum thermal insulation panel 100D shown in FIG. 6 differs from the vacuum thermal insulation panel 100 shown in FIG. 1 in that one opening Aw is provided in a cover 120D. In such a case, it is unnecessary to evacuate the inside of the cover 120D in the core material covering step; instead, evacuation of the inside of the cover 120D is performed simultaneously with evacuation of the inside of the metal foil 130 with the protective layer 140 in the evacuation step. In this case, it is preferable that at least a part of the opening Aw overlaps with an exhaust port Pe of the lid receiving portion of the upper metal foil 130 in a plan view (see FIG. 7). The method of producing the vacuum thermal insulation panel 100D allows for reducing the possibility that the dropped matter from the core material 110 adheres to the welded portion of the metal foil 130, and furthermore allows for reducing the pressure inside the metal foil 130 and inside the cover 120D simultaneously. Thus, the method of producing the vacuum thermal insulation panel 100D allows for reducing the occurrence probability of poor welding of the metal foil 130, and furthermore allows for reducing operating costs of a pressure reducing apparatus.

(E)

Though not specifically mentioned in the above embodiment, irregularities may be formed on the outer surface of the cover 120 by emboss processing or the like. In such a case, it is possible to reduce the pressure in the metal foil 130 while efficiently sucking the air existing between the cover 120 and the metal foil 130 in the evacuation step.

(F)

Though not specifically mentioned in the method of producing the vacuum thermal insulation panel according to the above embodiment, a preliminary step and a main step may be provided in the welding step.

In the preliminary step, a pressing force is applied to at least a part of the overlapping portions of the metal foil 130, and leveling portions to which the pressing force has been applied causes a leveling portion to be formed. Specifically, in the preliminary step, running, relative to a pressing jig, the metal foil 130 that has been at least partially overlapped (hereinafter, sometimes referred to as "stacked metal foil") and sticking at least a part of the overlapped portion of the metal foil 130 to at least a part of the overlapped portion while applying a pressing force thereto causes at least a part of the overlapped portion to be leveled, thereby forming a strip-shaped leveled portion whose electric resistance value has been leveled. Here, the pressing jig is, for example, a roller electrode or the like.

In the main step, the stacked metal foil is caused to run relative to the pressing jig so that the leveled portions formed in the preliminary step comes into contact with each other, thereby resistance-welding at least a part of the flat portion. Here, it is preferable that an electrification amount of the pressing jig in the main step (a heat quantity [second heat quantity] applied to the overlapping portion of the metal foil 130) is larger than an electrification amount of the pressing jig in the preliminary step (a heat quantity [first heat quantity] applied to the metal foil 130). for example, the second heat quantity is preferably a heat quantity within a range from 1.25 times the first heat quantity to 1.75 times the first heat quantity inclusive. Here, the pressing jig may be the same as the pressing jig used in the preliminary step, or may be a different type jig or a different jig. Here, the transition time from the preliminary step to the main step is preferably relatively short in order to shorten the producing time. In order to achieve this, for example, a welding apparatus for welding may be run so as to follow the welding apparatus for preheating.

(G)

In the method of producing the vacuum thermal insulation panel 100 according to the above embodiment, in the evacuation step, the laminate with its four sides welded is placed in a vacuum heating furnace in a state in which a metal disk-shaped lid (not shown) is put on the lid receiving portion of the metal foil 130 with the upper protective layer 140 with the metal-based brazing material interposed therebetween, and then a vacuum is produced by evacuation; however, when a glass-based brazing material is used instead of the metal-based brazing material, the metal disk-shaped lid (not shown) can be sealed without being put on the lid receiving portion. In the evacuation step, (i) the outer edge portion of the metal foil of the vacuum thermal insulation panel 100 may be welded in a vacuum chamber, or (ii) while a vacuum is pulled from an unwelded opening portion of the vacuum thermal insulation panel using the vacuum pack method, the opening portion may be welded to seal the opening portion.

Note:

The above-described modifications (A) to (G) may be independently applied; a combination of any two modifications among them may be applied; a combination of any three modifications among them may be applied; a combination of any four modifications among them may be applied; a combination of any five modifications among them may be applied; a combination of any six modifications among them may be applied; or a combination of all seven modifications may be applied.

Second Embodiment

Figure 8:
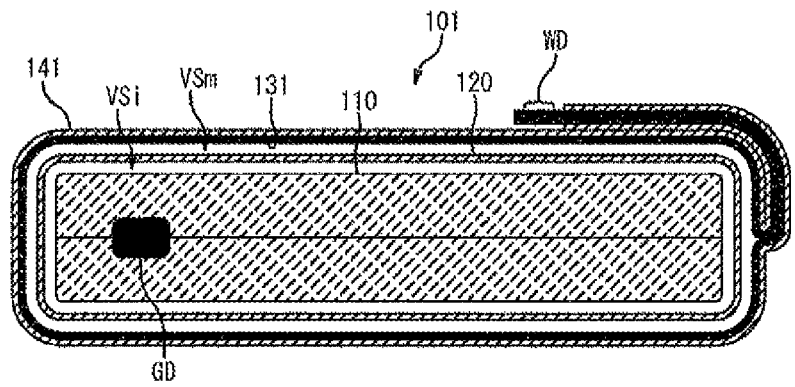
FIG. 8 is a vertical cross-sectional view of an example of a vacuum thermal insulation panel according to a second embodiment of the present invention.

The vacuum thermal insulation panel according to the second embodiment of the present invention differs from the vacuum thermal insulation panel according to the first embodiment in that, as shown in FIG. 8, a metal foil with a protective layer is folded back on one edge side thereof and welding of one edge portion thereof is not required. The method of producing the vacuum thermal insulation panel 101 according to the second embodiment is the same as the method of producing the vacuum insulation panel according to the first embodiment except that the metal foil 131 with a wide protective layer 141 is used. In FIG. 8, the same components as those of the vacuum thermal insulation panel 100 according to the first embodiment are denoted by the same reference numerals, and description thereof is omitted.

<Features of the Method for Producing the Vacuum Thermal Insulation Panel According to the Second Embodiment of the Present Invention>

In the method of producing the vacuum thermal insulation panel 101 according to the second embodiment of the present invention, the metal foil 131 with the protective layer 141 is folded back on one edge side of the vacuum thermal insulation panel 101, and thus welding of one edge portion thereof is not required. Thus, the method of producing the vacuum thermal insulation panel 101 allows for further reducing the occurrence probability of poor welding as compared with the method of producing the vacuum thermal insulation panel 100 according to the first embodiment.

Modifications

Figure 9:
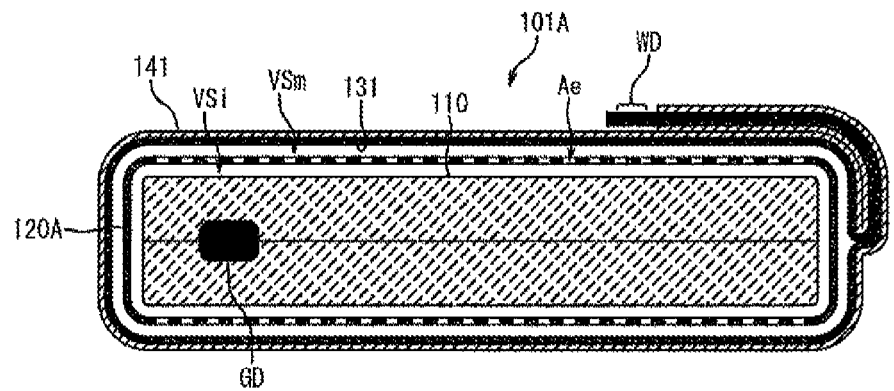
FIG. 9 is a vertical cross-sectional view of an example of a vacuum thermal insulation panel according to a modification (A) of the second embodiment.

In the method of producing the vacuum thermal insulation panel according to the above embodiment, the vacuum thermal insulation panel 101 as shown in FIG. 8 is produced;

alternatively, the vacuum thermal insulation panel 101A as shown in FIG. 9 may be produced. The vacuum thermal insulation panel 101A shown in FIG. 9 differs from the vacuum thermal insulation panel 101 shown in FIG. 8 in that a plurality of vent holes Ae are provided in the cover 120A. As the cover 120A, for example, the above-mentioned resin film or vapor deposition film having a plurality of holes formed therein, porous film, paper, nonwoven fabric, metal mesh, resin mesh, or the like can be used. In such a case, it is unnecessary to evacuate the inside of the cover 120A in the core material covering step; instead, evacuation of the inside of the cover 120A is performed simultaneously with evacuation of the inside of the metal foil 130 with the protective layer 140 in the evacuation step. In this case, it is preferable that at least a part of the vent holes Ae overlaps with the exhaust port of the lid receiving portion of the upper metal foil 130 in a plan view. The method of producing the vacuum thermal insulating panel 101A reduces the possibility that the dropped matter from the core material 110 adheres to the welded portion of the metal foil 130, and furthermore reduces the pressure inside the metal foil 131 and inside the cover 120A simultaneously. Thus, the method of producing the vacuum thermal insulation panel 101A allows for reducing the occurrence probability of poor welding of the metal foil 131, and furthermore allows for reducing operating costs of a pressure reducing apparatus.

Note:

The modifications (B) to (G) of the first embodiment may be applied to the vacuum thermal insulation panel and the method thereof according to the present embodiment. In such a case, the modifications (B) to (G) may be independently applied; a combination of any two modifications among them may be applied; a combination of any three modifications among them may be applied; a combination of any four modifications among them may be applied; a combination of any five modifications among them may be applied; or a combination of all six modifications may be applied.

The embodiments disclosed herein are to be considered in all respects as illustrative and not restrictive. The scope of the present invention is defined not by the above description but by the scope of the claims, and is intended that all modifications within meaning and scope equivalent to the claims are included. In addition, one or more configurations obtained by combining two or more configurations of the different embodiments described in this specification are also included in the scope of the present invention.

REFERENCE SIGNS LIST

100: vacuum thermal insulation panel
100A: vacuum thermal insulation panel
100B: vacuum thermal insulation panel
100C: vacuum thermal insulation panel
100D: vacuum thermal insulation panel
101: vacuum thermal insulation panel
101A: vacuum thermal insulation panel
110: core material
110B: core material
120: cover
120A: cover
120D: cover
130: metal foil
131: metal foil
WD: metal foil portion on the outer side of the core material
Ae, Aw: opening (first exhaust port)
Pe: exhaust port (second exhaust port)

The invention claimed is:

1. A method of producing a vacuum thermal insulation panel, comprising:
    a covering step of covering a core material, covered with a cover, with a metal foil;
    a welding step of resistance-welding a welding portion positioned on an outer side of an outer edge of the core material of portions of the metal foil in a plan view; and
    a pressure-reduction sealing step of simultaneously reducing a pressure inside the cover and a pressure inside the metal foil to seal the metal foil, wherein
    a first exhaust port is formed in the cover,
    a second exhaust port is formed in the metal foil inwardly of the welding portion in a plan view,
    the first exhaust port and the second exhaust port at least partially overlap with each other in the plan view, and
    in the pressure-reduction sealing step, the metal foil is sealed by sealing the second exhaust port in a state in which the pressure inside the cover and the pressure inside the metal foil are simultaneously reduced.

2. The method of producing a vacuum thermal insulation panel according to claim 1, wherein a water absorption rate of the cover is 1% or less.

3. The method of producing a vacuum thermal insulation panel according to claim 2, wherein irregularities are formed on a surface of the cover on a side toward the metal foil.

4. The method of producing a vacuum thermal insulation panel according to claim 1, wherein irregularities are formed on a surface of the cover on a side toward the metal foil.

5. A vacuum thermal insulation panel comprising:
    a core material;
    a cover that covers the core material; and
    a metal foil that covers the core material together with the cover and is resistance-welded at a welding portion positioned on an outer side of an outer edge of the core material in a plan view, wherein
    a first exhaust port is formed in the cover,
    a second exhaust port is formed in the metal foil inwardly of the welding portion in a plan view,
    the first exhaust port and the second exhaust port at least partially overlap with each other in the plan view, and
    the second exhaust port is sealed in a state in which a pressure inside the cover and a pressure inside the metal foil are simultaneously reduced.

6. The vacuum thermal insulation panel according to claim 5, wherein
    a pressure in the metal foil and a pressure in the cover are both within a range from 0.00001 Pa to 100 Pa inclusive, and
    the core material has a density within a range from 1 kg/m$^3$ to 600 kg/m$^3$ inclusive.

7. The vacuum thermal insulation panel according to claim 6, wherein irregularities are formed on a surface of the cover on a side toward the metal foil.

8. The vacuum thermal insulation panel according to claim 5, wherein irregularities are formed on a surface of the cover on a side toward the metal foil.

* * * * *